United States Patent
Cozza

(12) 
(10) Patent No.: US 6,196,375 B1
(45) Date of Patent: Mar. 6, 2001

(54) STRUCTURE WITH IDLE ROLLERS FOR GUIDE WALLS OF GOODS CONVEYORS

(75) Inventor: Riccardo Cozza, Modena (IT)

(73) Assignee: Rexnord Marbett S.p.A., Reggio Emilia (IT)

( * ) Notice: Subject to any disclaimer, the term of this patent is extended or adjusted under 35 U.S.C. 154(b) by 0 days.

(21) Appl. No.: 09/233,875

(22) Filed: Jan. 20, 1999

(30) Foreign Application Priority Data

Jan. 22, 1998 (EP) .................................................. 98830023

(51) Int. Cl.$^7$ .................................................. B65G 21/20
(52) U.S. Cl. ..................................... 198/836.1; 193/35 C
(58) Field of Search ............................. 198/836.1–836.4; 193/35 C

(56) References Cited

U.S. PATENT DOCUMENTS

| | | | |
|---|---|---|---|
| 4,067,428 | * | 1/1978 | Shuttleworth ........................ 193/35 C |
| 5,082,108 | * | 1/1992 | Douglas .............................. 198/836.4 |
| 5,213,403 | | 5/1993 | Lautenschläger ..................... 312/348 |
| 5,331,993 | | 7/1994 | Billbury .............................. 135/119 |
| 5,346,161 | * | 9/1994 | Eilenstein-Wiegmann et al. .. 193/35 C |

FOREIGN PATENT DOCUMENTS

| | | | |
|---|---|---|---|
| 0 787 666 A2 | 11/1996 | (EP) | ............................... B65G/21/20 |
| 2 261 773 | 11/1991 | (GB) | ............................... H01R/31/06 |

* cited by examiner

*Primary Examiner*—Christopher P. Ellis
*Assistant Examiner*—Mark A. Deuble
(74) *Attorney, Agent, or Firm*—Michael Best & Friedrich LLP

(57) ABSTRACT

A structure with idle rollers is intended for guide walls of goods conveyors comprising a surface for conveying the goods and at least one plate-like wall element extending longitudinally along the conveyor surface, adjacent to at least one of its edges, following its path. Roller-carriers each having a predetermined number of rollers mounted idly on axles and rotatable about rotation axes are snap-fitted on the plate-like wall element. The ends of the axles are supported by plates carried by the roller-carrier. The length of each roller-carrier depends on the minimum radius of curvature encountered in the path of the goods-conveying surface of the conveyor. The roller-carriers are connected to one another by snap-engagement members. The ends of the axles of the rollers are also snap-fitted in respective seats in the plates of the roller-carrier.

8 Claims, 5 Drawing Sheets

STRUCTURE WITH IDLE ROLLERS FOR GUIDE WALLS OF GOODS CONVEYORS

FIELD OF THE INVENTION

The present invention relates to a structure with idle rollers for guide walls of goods conveyors comprising a surface for conveying the goods and at least one plate-like wall element extending longitudinally along the conveyor surface, following its path, the plate-like element having idle rollers rotatable about rotation axes arranged side by side and disposed at an angle to the surface for conveying the goods.

The known structure specified above is commonly used both for conveyors in which the conveyor surface is constituted by a conveyor belt and for accumulation conveyors in which the surface for conveying the goods is fixed and the goods slide thereon by gravity or by force.

BACKGROUND OF THE INVENTION

One of the basic problems encountered in connection with the aforementioned roller structure for guide walls is that its structure is closely linked to the configuration of the conveyor path, which is sometimes very tortuous, and that it cannot therefore be used in other conveyors having different path configurations.

The poor or non-existent flexibility of the known structure for adaptation to different conveyor-path configurations renders it very expensive since, in practice, it has to be made to measure for each type of conveyor path.

The object of the present invention is to devise a structure with idle rollers for guide walls of conveyors which overcomes the problems complained of with reference to the known structure and which can be adapted to conveyor paths of every type.

A further object of the invention is to enable the structure to be fitted quickly on the wall elements of conveyors with considerable economic savings.

BRIEF DESCRIPTION OF THE DRAWINGS

The invention will now be described in greater detail with reference to a practical embodiment given purely by way of non-limiting example and illustrated in the appended drawings, in which:

FIG. 4 is an elevational view of the wall of FIG. 2 taken from the side with the idle rollers.

DETAILED DESCRIPTION OF THE INVENTION

Figure 1:
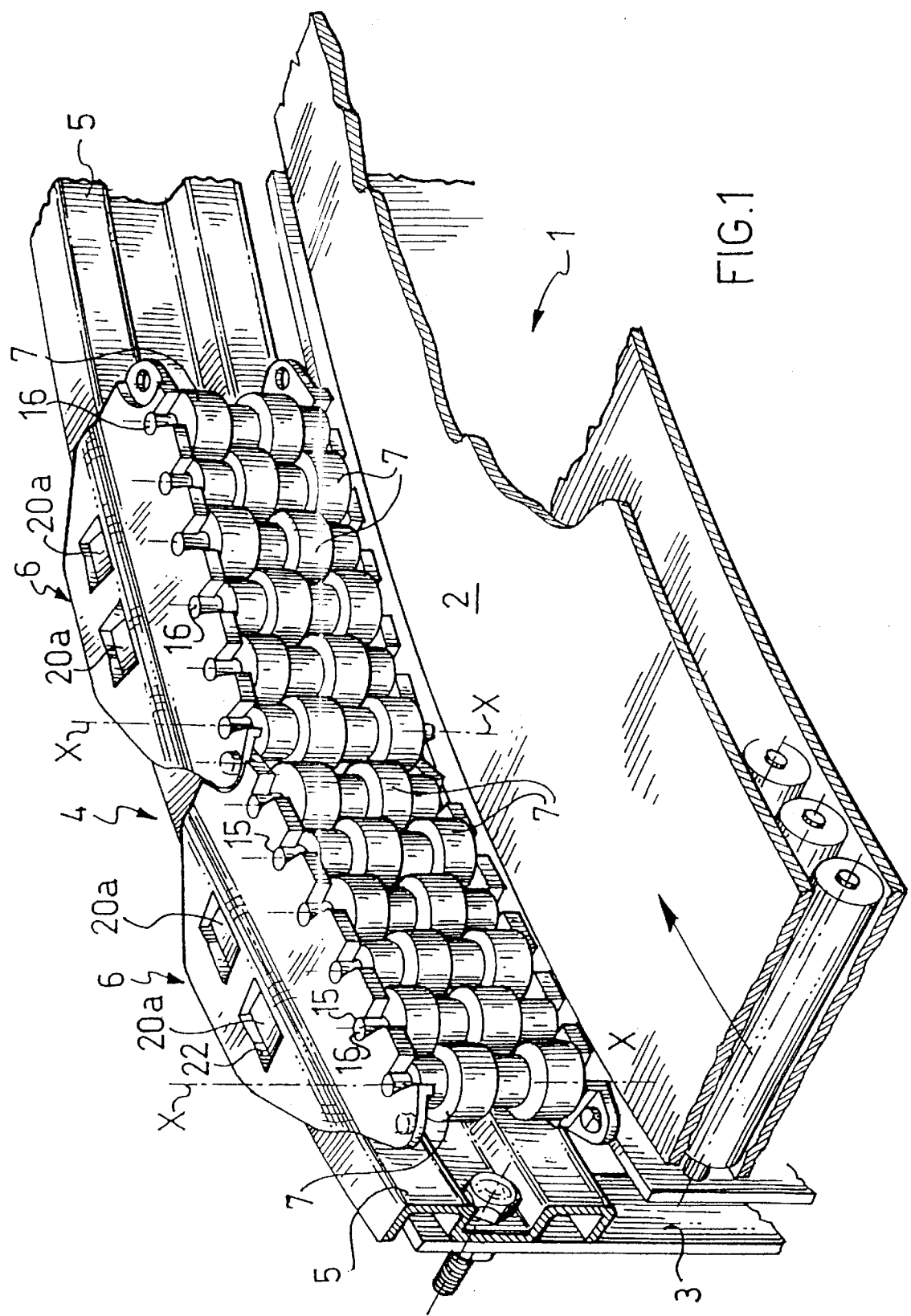
FIG. 1 is a partially-sectioned, schematic, perspective view of a portion of conveyor with a wall equipped with a structure with idle-roller carriers according to the invention.
Figure 2:
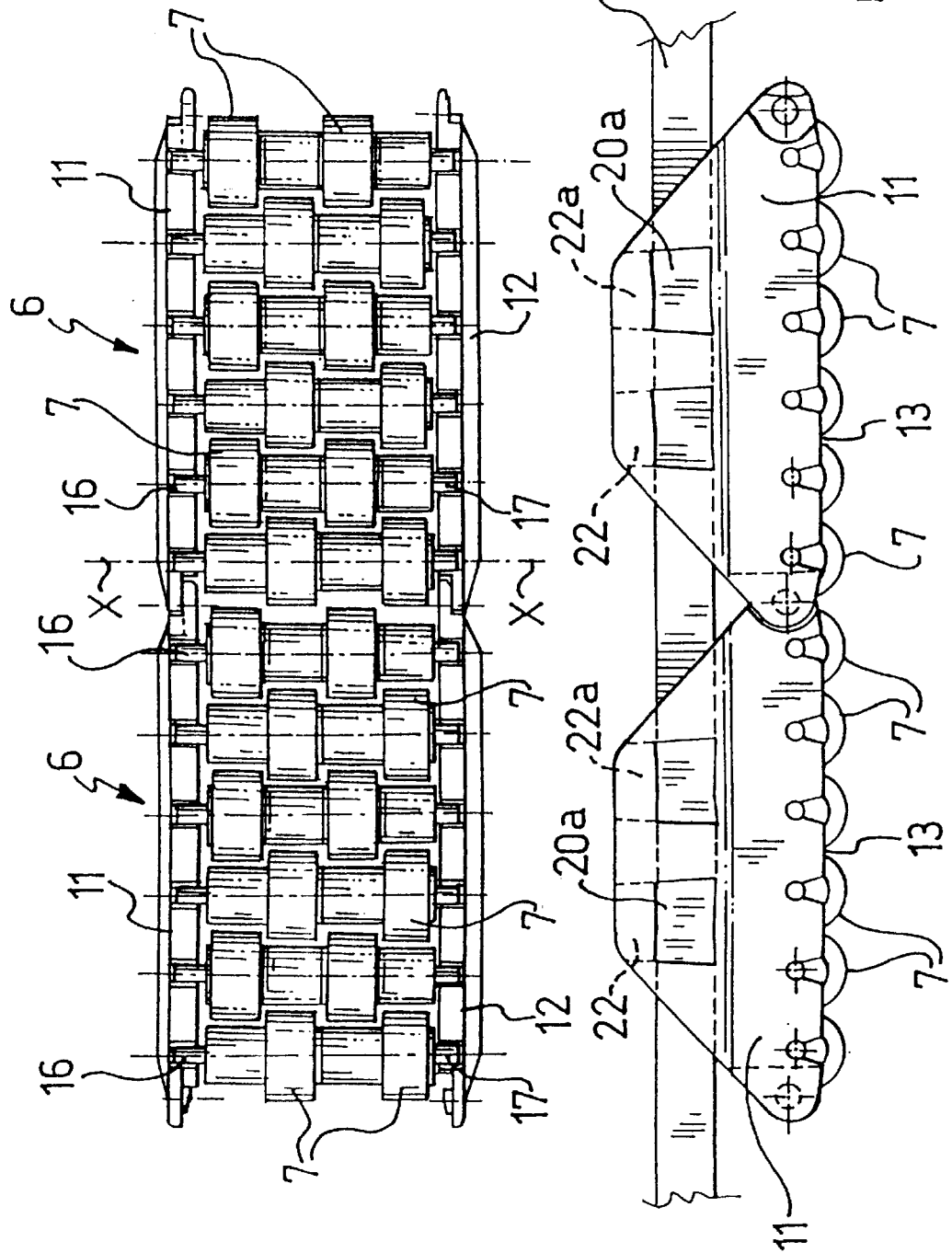
FIG. 2 shows the wall with idle-roller carriers of FIG. 1, from above, in a straight portion of the conveyor.
Figure 3:
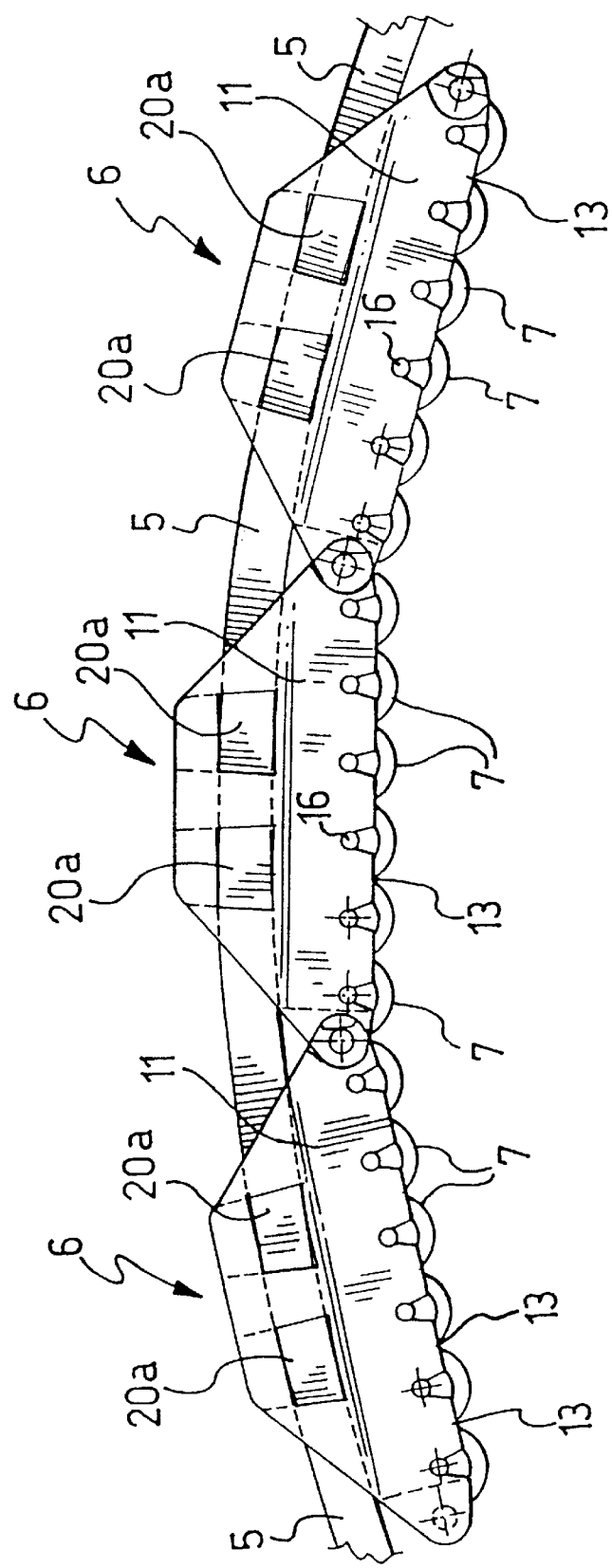
FIG. 3 shows the wall with idle-roller carriers of FIG. 1, from above, in a curved portion of the conveyor.

With reference to the drawings and in particular to FIG. 1, a generic goods conveyor, generally indicated 1, comprises a surface 2 on which the goods are conveyed. In the embodiment illustrated, this surface 2 is in the form of a conventional conveyor belt. Alternatively, this surface may be represented by a fixed horizontal element or by an inclined chute of the type conventionally used in devices for accumulating products in packaging equipment.

The surface extends along any path with straight and curved portions; the latter may have different radii of curvature.

Beside the conveyor surface 2, fixed to the support structure 3, there is at least one guide wall 4 for laterally restraining the goods moving on the surface 2.

For reasons of simplification, only one guide wall is shown in the embodiment illustrated but naturally the conveyor 1 may also be equipped with a second lateral guide wall opposite the first or even, in conventional manner, with intermediate guides disposed in the centre of the conveyor surface 2 for dividing it into two channels disposed side by side.

The guide wall 4 comprises a continuous plate-like element 5 with a cross-section which is bent to increase its stiffness, for supporting a plurality of roller-carriers 6 of the rollers 7 of which are mounted for rotating on respective axles 7a disposed side by side and lying at an angle to the conveyor surface 2.

In the embodiment illustrated, the positioning of the rollers 7 is such that their axes of rotation X—X are perpendicular to the conveyor surface 2.

Each roller-carrier 6 comprises a plate-like web 8 with two parallel opposite sides 9 and 10.

The length, and hence the number of rollers, of each roller-carrier 6 is determined in dependence on the minimum radius of curvature present in the path configuration of the conveyor 1.

The smaller the radius of curvature is, the more the length of the roller-carriers is restricted to enable them to be mounted on the support 5 on the bends, at the same time ensuring continuity of the guide-wall function of the rollers 7.

At the sides 9 and 10 of the plate-like web, each roller-carrier 6 has respective transverse plates 11 and 12 which form an opposed pair with edges 13 and 14 which project sideways relative to the plate-like web 8 on the side facing the conveyor surface 2.

The unit formed by the web 8 and by the transverse plates 11 and 12 of the roller-carrier 6 is preferably made of plastics material, for example, of acetal resin.

The rollers 7, on the other hand, may be made either of plastics material or of stainless steel.

The edges 13 and 14 have seats 15 for the fixed support of the ends 16 and 17 of each of the axles 7a on which the idle rollers 7 are mounted. Their structure is not described in detail since it is conventional in the art.

Each seat 15 has a flared mouth 18 opening towards the respective free edge 13 or 14 of the pair of transverse plates 11 and 12.

Each mouth 18 is connected to the respective seat 15 by means of an opening 19 the transverse dimensions of which are slightly smaller than the diameters of the ends 16 and 17 of the axles 7a of the rollers 7. These dimensions are nevertheless such as to allow the ends of the axles 7a to be snap-engaged in the respective seats 15 by virtue of the resilience of the walls of the mouth 18.

On the opposite side of the plate-like web 8 to the conveyor surface 2, the plates 11 and 12 have respective projecting tabs 20 and 21 having pairs of stop teeth 22, 22a and 23, 23a spaced from the web 8 by a distance substantially equal to the thickness of the plate-like element 5.

The pairs of stop teeth 22, 22a and 23, 23a are formed adjacent openings 20a and 21a for reducing the weight of the tabs 20 and 21.

At least one of the tabs, for example, the tab 21, is resiliently flexible in the plane containing the other tab 20 which advantageously is substantially rigid.

As shown in FIG. 1, the tabs 20 and 21 enable the roller-carriers 6 to be snap-fitted on the plate-like element 5 and the more rigid tab 20 enables a stable positioning to be maintained during the operation of the conveyor when the rollers 7 are struck by the goods in transit on the conveyor surface 2.

In particular, the snap-fitting takes place by engagement of the rigid tab 20 with the upper edge of the plate-like element 5 and pivoting of the roller-carrier 6 about this edge until the resilient tab 21 is snap-engaged under the opposite edge of the element 5.

Figure 7:
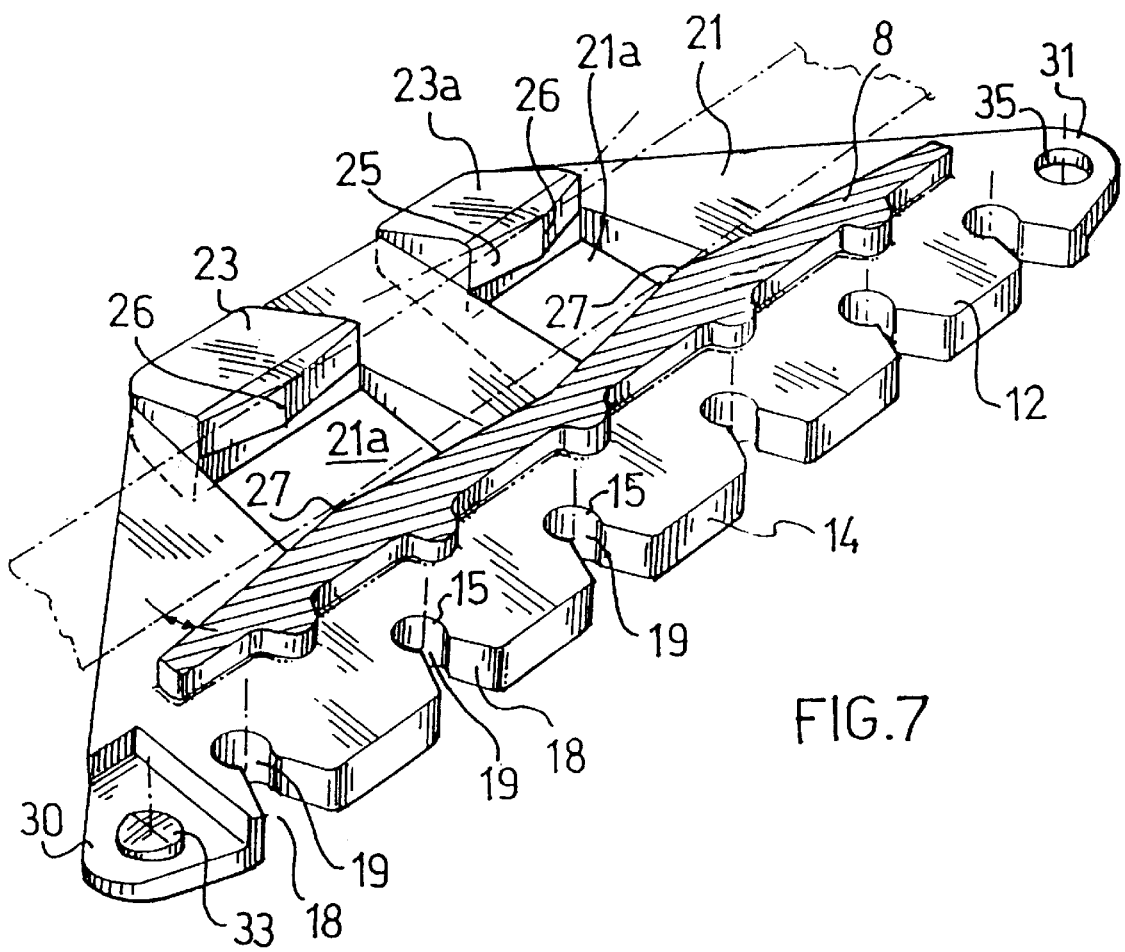
FIG. 7 is a perspective view of the idle-roller carrier, sectioned on the line VII—VII of FIG. 6.

Contact between the raised portions 24 and 25 of the pairs of teeth 22, 22a and 23, 23a and the plate-like element 5 as well as contact between the plate-like web 8 and the opposite surface of the same plate-like element 5 is preferably limited to the substantially linear regions corresponding to the tips 26 of the raised portions of the teeth and the tips 27 of the plate-like web 8, as shown in FIG. 7.

Contact of this type enables the roller-carriers 6 to adhere better to the support 5, particularly on arcuate portions of the conveyor path, preventing oscillations and vibrations.

Moreover, it enables the roller-carrier 6 also to be mounted on guide portions with small radii of curvature.

Figures 5, 6:
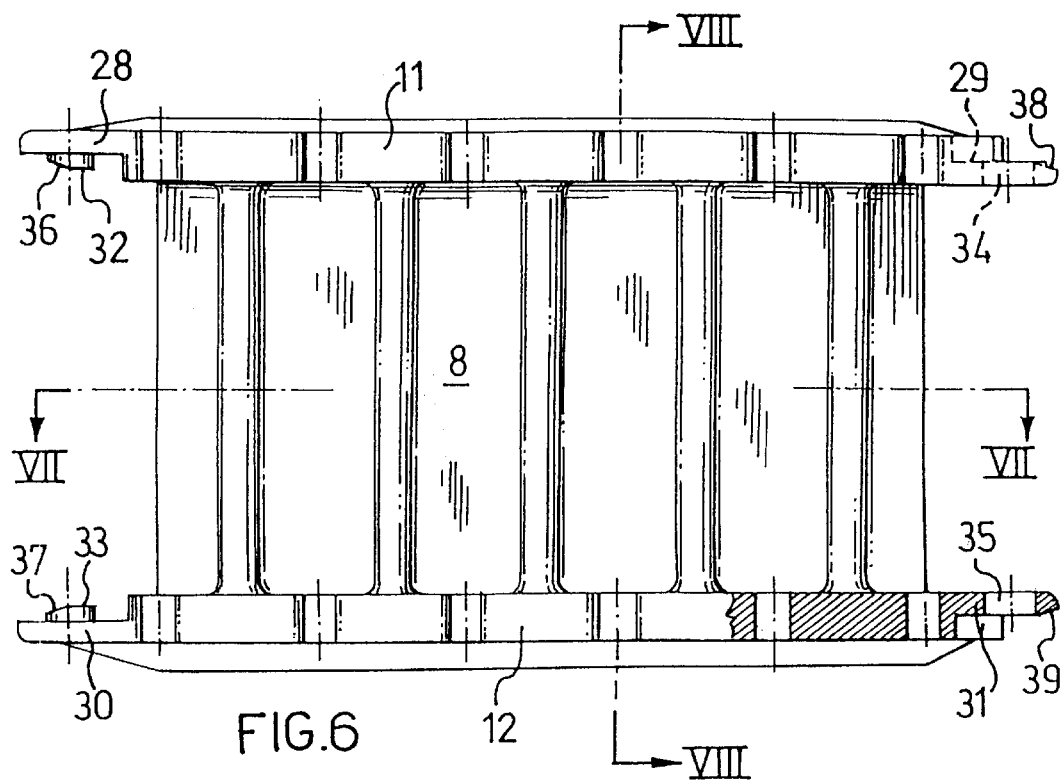
FIG. 5 is a plan view of a roller-carrier according to the invention.
FIG. 6 is a partially-sectioned front view of the roller-carrier of FIG. 4.
Figure 8:
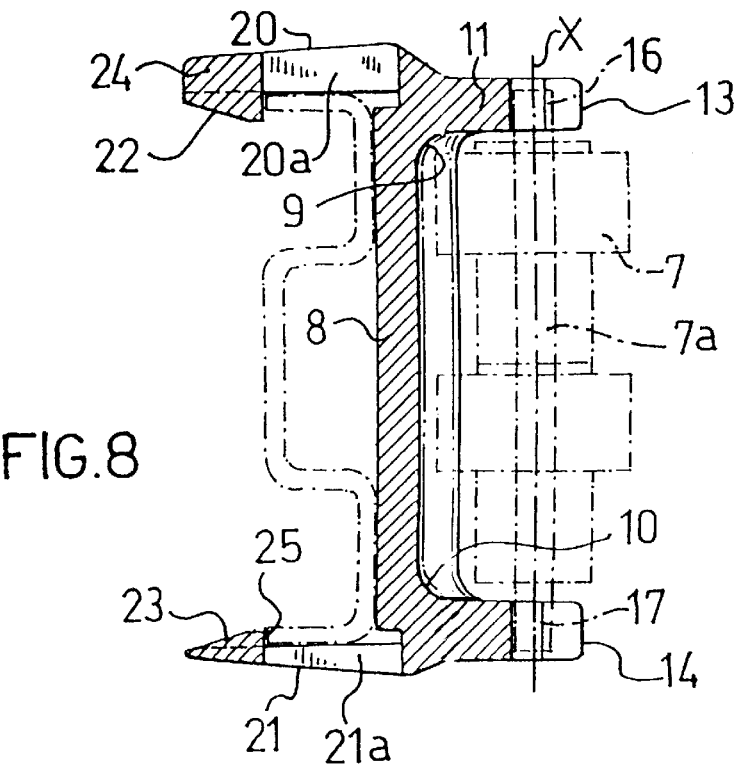
FIG. 8 shows the idle-roller carrier sectioned on the line VIII—VIII of FIG. 6.

With reference now to FIGS. 5 and 6, it can be seen that the plates 11 and 12 have pairs of appendages indicated 28, 29, and 30, 31, respectively.

These appendages have means for enabling the roller-carriers 6 to be connected to one another by snap-engagement.

These means are constituted by cylindrical projections 32, 33 formed on the appendages 28 and 30 and by circular holes 34 and 35 formed in the appendages 29 and 31.

The cylindrical projections 32 and 33 have respective chamfers 36 and 37 which facilitate their insertion in the holes 34 and 35 which also have inclined flat lead-in portions indicated 38 and 39, respectively, in FIGS. 5 and 6.

The structure according to the present invention therefore achieves the advantage that roller guide-walls for conveyors can be formed by means of identical modular components, which can thus be produced with a great economic saving and each of which has a predetermined number of rollers.

A further advantage is connected with the fact that each roller-carrier 6 is snap-fitted on the plate-like wall element 5 of the conveyor 1 and there is therefore no need to use fixing members such as screws and bolts the use of which results in long assembly times, in addition to the cost.

Moreover, the advantage extends to the capability offered by the structure according to the invention also to form snap connections between the roller-carriers, as well as to snap-fit the individual axles 7a of the rollers 7 on each roller-carrier.

What is claimed is:

1. A structure with idle rollers for guide walls of goods conveyors comprising a surface for conveying the goods and at least one plate-like wall element extending longitudinally along the conveyor surface, following its path, the plate-like element having idle rollers rotatable about rotation axes arranged side by side and disposed at an angle to the surface for conveying the goods, and including roller-carriers each equipped with a predetermined number of rollers, the roller-carriers being articulated to one another and fixed to the plate-like wall element, each roller-carrier comprising a plate-like web with at least two parallel opposed sides spaced apart longitudinally in the direction of the axes of rotation of the idle rollers, a pair of plates each connected transversely to the web, on a respective one of its opposed sides, the plates having respective free edges projecting relative to the web, a plurality of seats formed in the pair of opposed plates for supporting the ends of axles of the idle rollers, engagement means for connection to the wall element of the conveyor, and engagement means for articulation to adjacent roller-carriers, wherein the engagement means for the connection of each roller-carrier to the wall element of the conveyor comprise a pair of tabs fixed to the opposed plates of the roller-carriers and projecting relative to the web of the roller-carrier on the opposite side to that having seats for supporting the ends of the axles of the rollers, each tab having a respective pair of stop teeth opposite those of the other tab, each tooth being positioned at a distance from the web substantially equal to the thickness of the wall element, at least one tab of the pair of tabs being resiliently flexible in the plane also containing the other tab, which is substantially rigid.

2. A structure with idle rollers according to claim 1, wherein the predetermined number of rollers in each roller carrier is reduced as a radius of curvature present in the path of the goods-conveying surface of the conveyor is decreased.

3. A structure with idle rollers according to claim 1, wherein the engagement means for the connection of each idle-roller carrier to the wall element of the conveyor are snap-engagement means.

4. A structure with idle rollers according to claim 1 wherein each stop tooth and the plate-like web have respective opposed tips which are aligned with one another and which contact the wall element.

5. A structure with idle rollers according to claim 1, wherein each seat of the plurality of seats for rotatably supporting the ends of the axles of the idle rollers on each roller-carrier is shaped for snap-engagement with the corresponding end of the axle of the roller.

6. A structure with idle rollers according to claim 1, wherein each seat of the plurality of seats for supporting the ends of the axles of the idle rollers on each roller-carrier has a flared lateral access mouth opening towards the free edge of the respective plate, the through aperture between the mouth and the seat being smaller than the diameter of the end of the axle to be housed in the seat to an extent such as to permit snap-engagement thereof by resilient deformation of the walls of the lateral access mouth.

7. A structure with idle rollers for guide walls of goods conveyors comprising a surface for conveying the goods and at least one plate-like wall element extending longitudinally along the conveyor surface, following its path, the plate-like element having idle rollers rotatable about rotation axes arranged side by side and disposed at an angle to the surface for conveying the goods, and including roller-carriers each equipped with a predetermined number of roller, the roller-carriers being articulated to one another and fixed to the plate-like wall element, comprising engagement means for the articulation of the roller-carriers to one another, said engagement means including a pair of appendages fixed to the pairs of plates which are fixed transversely to the plate-like web of each roller-carrier, the appendages of each pair of plates being substantially coplanar with the respective plates, projecting on opposite sides in directions perpendicular to the axes of rotation of the rollers, and having snap-coupling members at their ends.

8. A structure with idle rollers according to claim 7, wherein the snap-coupling members are constituted by projections and recesses.

* * * * *